Oct. 26, 1965
U. F. GIANOLA
3,214,605
LOGIC ARRANGEMENTS
Filed July 11, 1960
FIG. 1
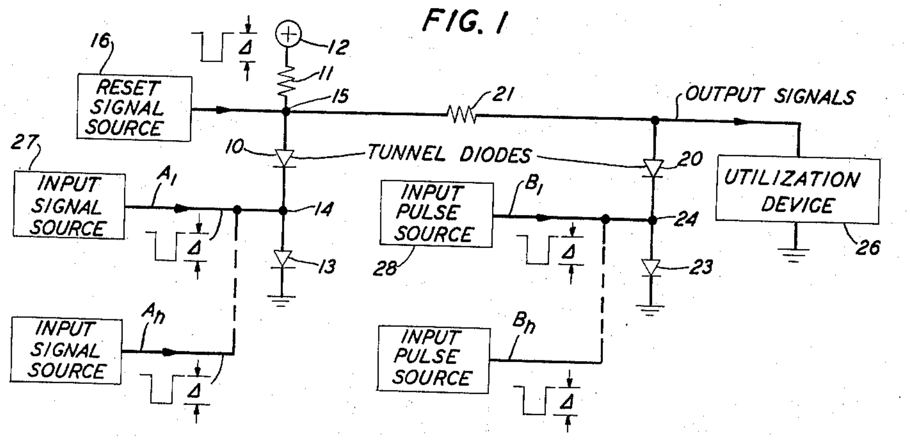
FIG. 2
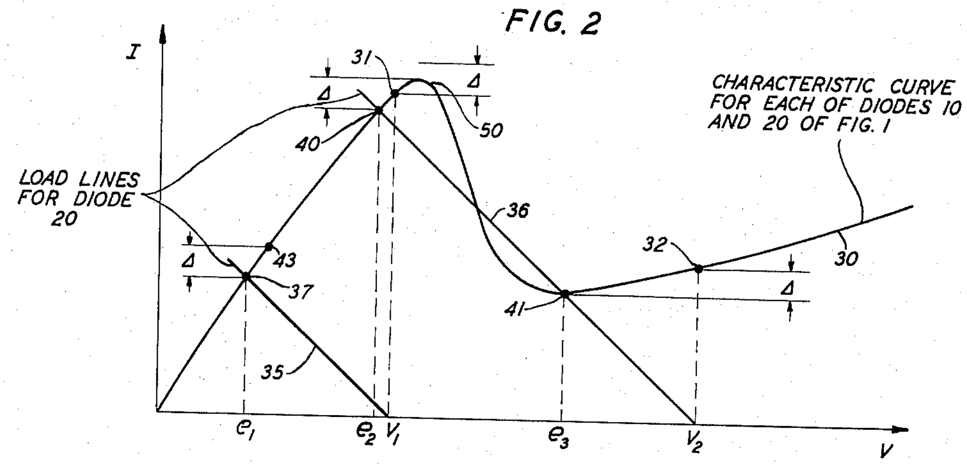
FIG. 3
DEFINITIVE SPECIFICATION OR TRUTH TABLE FOR LOGIC ARRANGEMENT OF FIG. 1
| ROW | INPUT SIGNALS | | OUTPUT SIGNALS |
|---|---|---|---|
| 1 | $A_1'$ | $B_1'$ | $e_1$ |
| 2 | $A_1'$ | $B_1$ | $e_1$ |
| 3 | $A_1$ | $B_1'$ | $e_2$ |
| 4 | $A_1$ | $B_1$ | $e_3$ |
| 5 | $A_1$ FOLLOWED BY $B_1$ | | $e_3$ |
| 6 | $B_1$ FOLLOWED BY $A_1$ | | $e_2$ |
| | RESET SIGNAL | | $e_1$ |
INVENTOR
U.F. GIANOLA
BY Lucian C. Canepa
ATTORNEY United States Patent Office 3,214,605
Patented Oct. 26, 1965

3,214,605

LOGIC ARRANGEMENTS

Umberto F. Gianola, Florham Park, N.J., assignor to Bell Telephone Laboratories, Incorporated, New York, N.Y., a corporation of New York Filed July 11, 1960, Ser. No. 42,140
10 Claims. (Cl. 307—88.5)

This invention relates to signal translating arrangements, and more particularly to logic arrangements employing negative resistance diodes.

As the complexity and sophistication of modern day digital information processing systems increase, the functions which the logic arrangements of such systems are required to perform have become more diverse and intricate. Moreover, it is becoming increasingly important that these functions be performed by logic arrangements which are highly reliable and extremely fast.

An object of the present invention is the improvement of signal translating arrangements.

More specifically, an object of this invention is the provision of logic arrangements which are characterized by high speed, low power dissipation, high reliability, and simplicity of design.

These and other objects of the present invention are realized in a specific illustrative embodiment thereof which includes two intercoupled circuits each one of which includes a negative resistance diode of the voltage-controlled type. The first or driving circuit is biased for bistable operation. For one stable condition of the first circuit, the second or driven circuit is biased for monostable operation by the voltage appearing across the negative resistance diode of the first circuit, while for the other stable condition of the first circuit, the second circuit is biased for bistable operation by the voltage appearing across the negative resistance diode of the first circuit. A first signal source is coupled to the first circuit for switching it between its two stable conditions, and a second signal source is coupled to the second circuit for either causing it to shift about its single stable operating point or to switch it between its two stable conditions depending respectively on whether the first circuit is in one or the other of its two stable conditions. A utilization or output device is coupled to the second circuit and assumes a condition which is a logical function of the signals supplied to the circuits by the first and second sources.

Thus, a logic arrangement made in accordance with the principles of the present invention includes a bistable circuit which is switchable between its two stable conditions by a first signal source, thereby selectively biasing a second circuit to respectively respond to a second signal source in a monostable or a bistable manner.

It is a feature of the present invention that a logic arrangement include a driven circuit which is biased for monostable or bistable operation depending respectively on the condition of a driving bistable circuit.

It is another feature of this invention that a logic arrangement include a driven circuit, a driving bistable circuit, and a signal source for switching the driving circuit between its two stable conditions, whereby the driven circuit is biased for monostable or bistable operation depending respectively on the condition of the driving circuit.

It is still another feature of the present invention that a logic arrangement include a driven circuit including a negative resistance diode, a bistable circuit including a negative resistance diode for biasing the driven circuit for monostable or bistable operation depending respectively on the condition of the bistable circuit, a first signal source for controlling the condition of the bistable circuit, and a second signal source and a utilization device each coupled to the driven circuit.

A complete understanding of the present invention and of the above and other features and advantages thereof may be gained from a consideration of the following detailed description of an illustrative embodiment thereof presented hereinbelow in connection with the accompanying drawing, in which:

FIG. 1 is a schematic showing of a specific illustrative logic arrangement embodying the principles of the present invention;

FIG. 2 illustrates the voltage-current characteristic curve of each of the tunnel diodes shown in FIG. 1 and, further, depicts various operating points for the diodes; and FIG. 3 is a definitive specification or truth table relating the input and output signals of the arrangement of FIG. 1.

A great variety of electronic devices and circuits exhibit negative resistance characteristics and it has long been known that such negative resistance characteristics may have one of two forms. The N-type negative resistance, which is referred to as open-circuit stable (or short-circuit unstable, or voltage-controlled), is characterized by zero-resistance turning points. The S-type negative resistance, which is referred to as short-circuit stable (or open-circuit unstable, or current-controlled), is the dual of the N-type and is characterized by zero-conductance turning points. The thyratron and dynatron are vacuum tube examples of devices which respectively exhibit S- and N-type negative resistance characteristics.

Illustrative embodiments of the principles of the present invention include negative resistance diodes of the voltage-controlled type. One highly advantageous example of this type of two-terminal negative resistance arrangement in the so-called tunnel diode. Tunnel diodes are described in the literature: see, for example, "New Phenomenon in Narrow Germanium P-N Junctions," L. Esaki, Physical Review, volume 109, January–March 1958, pages 603–604, "Tunnel Diodes as High-Frequency Devices," H. S. Sommers, Jr., Proceedings of the Institute of Radio Engineers, volume 47, July 1959, pages 1201–1206, and "High-Frequency Negative-Resistance Circuit Principles for Esaki Diode Applications," M. E. Hines, The Bell System Technical Journal, volume 39, May 1960, pages 477–513.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction; that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Referring now to FIG. 1, there is shown a logic arrangement including a first or driving circuit comprising a tunnel diode 10 connected in series with a resistor 11, a positive direct-current voltage source 12, and a conventional asymmetrically-conducting diode element 13. Coupled to a point 14 between the diodes 10 and 13 is an input signal source 27, and coupled to a point 15 between the resistor 11 and the diode 10 is a reset signal source 16.

Also coupled to the point 15 is a second or driven circuit comprising a tunnel diode 20 connected in series with a resistor 21 and a conventional asymmetrically-conducting diode element 23. Coupled to a point 24 between the diodes 20 and 23 is an input signal source 28, and connected across the diodes 20 and 23 is a utilization device 26.

Quiescently, i.e., in the absence of the application of signals from the reset source 16 and the input sources 27 and 28 of the logic arrangement of FIG. 1, the values of the source 12 and of the resistors 11 and 21 are so selected that the tunnel diode 10 of the first or driving circuit is biased for bistable operation. Specifically, the values are so selected that the diode 10 possesses two stable operating points 31 and 32 on the voltage-current characteristic curve 30 shown in FIG. 2, the point 31 being on the relatively low voltage positive resistance region of the curve, corresponding to a voltage value $V_1$, and the point 32 being on the relatively high positive resistance region thereof, corresponding to a voltage value $V_2$.

Assuming, for the purpose of simplification, that the asymmetrically conducting diodes 13 and 23 of FIG. 1 are ideal devices whose forward resistances are approximately zero, the voltage across the tunnel diode 10 is approximately the same as the voltage from the point 15 to ground and the voltage across the tunnel diode 20 is approximately the same as the voltage across the utilization device 26. Accordingly, when the diode 10 is at its relatively low voltage stable operating point 31, the voltage at the point 15 and, hence, in effect, the source voltage for the second or driven circuit is the voltage value $V_1$. Similarly, when the diode 10 of the driving bistable circuit is at its relatively high voltage stable operating point 32, the voltage available at the point 15 as a source for the driven circuit including the tunnel diode 20 is the voltage value $V_2$.

When the tunnel diode 10 shown in FIG. 1 is biased at the relatively low voltage stable operating point 31, the load line 35 for the tunnel diode 20 extends through the voltage axis of FIG. 2 at the point $V_1$ and intersects the voltage-current characteristic curve at a single stable operating point 37, the absolute value of the slope of the load line 35 being determined by the value of the resistor 21. On the other hand, when the voltage across the diode 10 is relatively high, at the value $V_2$, the load line 36 for the diode 20 extends through the voltage axis of FIG. 2 at the point $V_2$ and intersects the voltage-current characteristic curve at two stable operating points, a relatively low voltage point 40 and a relatively high voltage point 41, the absolute value of the slope of the load line 36 being determined by the value of the resistor 21. The voltages corresponding to the operating points 37, 40, and 41, are designated in FIG. 2 as $e_1$, $e_2$, and $e_3$, respectively.

Thus, initially, i.e., when no input signals are applied to the circuit of FIG. 1, and assuming that the tunnel diode 10 is biased at its relatively low voltage operating point 31, thereby supplying the voltage $V_1$ to the driven circuit, the driven circuit is biased for monostable operation at the point 37 and the voltage across the diode 20 and, hence, the output voltage, has the value $e_1$. This set of input and output signal conditions is represented in the first row of the truth table shown in FIG. 3, in which table a prime designation on either one of the input signal symbols $A_1$ and $B_1$ indicates that that input signal is not present. In other words, the first row of FIG. 3 indicates that in the absence of input signals from the sources 27 and 28, and for the initial conditions assumed above, the output signal, i.e., the voltage across the utilization device 26, is the voltage $e_1$.

It is to be understood that following each application of a pair of input signals to the logic arrangement of FIG. 1, a negative reset signal of amplitude $\Delta$ is advantageously applied by the source 16 to the point 15, thereby either to switch the diode 10 from the point 32 back to the relatively low voltage point 31 or, if the diode 10 is already at its stable operating point 31, to maintain it at the point 31. In this way the logic arrangement is periodically returned to the above-assumed initial operating conditions and is thereby readied to respond to other input signals in the selective manner specified herein.

Advantageously, in order to keep the number of required signal levels at a minimum, the amplitude $\Delta$ is selected to be a single value which is sufficient to cause the diode 10 to switch from the point 31 to the point 32, or from the point 32 to the point 31, and which is also sufficient to switch the diode 20 from the point 40 to the point 41. However, it is significant to note that in accordance with the principles of this invention no upper limits on the value of $\Delta$ need be imposed.

The second row of the truth table of FIG. 3 indicates that in the absence of an input signal $A_1$ from the source 27 and in the presence of an input signal $B_1$ from the source 28, the output signal remains at the voltage level $e_1$. This can be verified by referring to FIG. 2. A negative input signal $B_1$ of amplitude $\Delta$ applied from the source 28 to the point 24 of the second or driven circuit appears across the conventional diode 23, whose reverse resistance is ideally infinite, and causes the operating point of the tunnel diode 20 to shift by an amount $\Delta$ from the stable point 37 to a higher voltage point 43. Then, when the negative inptu signal $B_1$ returns to a zero level, the operating point of the tunnel diode 20 returns to the single stable point 37, which corresponds to the output voltage $e_1$.

The third row of the truth table of FIG. 3 indicates that in the absence of an input signal $B_1$ from the source 28 and in the presence of an input signal $A_1$ from the source 27, the output signal assumes the value $e_2$. This can also be verified by referring to FIG. 2, wherein it is seen that a negative input signal $A_1$ of amplitude $\Delta$ applied from the source 27 to the point 14 of the first or driving circuit appears across the conventional diode 13 and causes the operating point of the tunnel diode 10 to switch over the peak point 50 of the characteristic curve to the higher voltage stable operating point 32. This switching action causes the load line for the diode 20 to move upwards and to the right, while maintaining a parallel relationship with the line 35, to the position represented by the line 36. The low voltage stable operating point 40 on the load line 36 corresponds to the voltage level $e_2$ and is, therefore, the voltage across the tunnel diode 20 and, as indicated in the third row of FIG. 3, is also the output signal which appears across the utilization device 26.

The simultaneous application of negative input signals $A_1$ and $B_1$ from the sources 27 and 28 to the points 14 and 24, respectively, of the logic arrangement of FIG. 1 causes the operating point of the first or bistable circuit to switch from the point 31 to the relatively high voltage point 32, thereby causing the load line of the driven tunnel diode 20 to shift upwardly, causing the quiescent operating point of the diode 20 to shift on the relatively low voltage positive resistance region of the voltage-current characteristic curve thereof from the point 37 to the point 40, and thereby making it possible for the negative input signal $B_1$ to switch the diode 20 from the low voltage point 40 to the relatively high voltage point 41 which corresponds to the voltage level $e_3$. This set of conditions, i.e., the simultaneous application of the input signals $A_1$ and $B_1$ to provide the output signal $e_3$, is listed in the fourth row of the table of FIG. 3.

Similarly, if the negative input signal $A_1$ is applied to the point 14 of FIG. 1, and then followed at a later time by the application of the negative input signal $B_1$, it is seen from FIG. 2 that the driving tunnel diode 10 is switched to its relatively high voltage stable point 32 by the signal $A_1$, thereby to provide the voltage $V_2$ at the point 15, that the operating point of the driven tunnel diode 20 is thereby shifted from the point 37 to the point 40, and that the subsequent application of the signal $B_1$ causes the diode 20 to switch from the point 40 to the point 41. Thus, the output voltage assumes the level $e_3$ in response to the input signal condition listed in the fifth row of FIG. 3.

On the other hand, if the negative input signal $B_1$ is applied to the logic arrangement of FIG. 1 before the input signal $A_1$, and in nonoverlapping relationship therewith, the output signal assumes the voltage level $e_2$, as indicated in the sixth row of FIG. 3. This can be comprehended by referring to FIG. 2 and noting that the application of the signal $B_1$ to the point 24 simply causes the operating point of the diode 20 to shift from the point 37 to the point 43 and, then, as the signal $B_1$ returns to a zero level, back again to the point 37. The subsequent application of the signal $A_1$ to the point 14 causes the diode 10 to switch from the point 31 to the point 32, thereby causing the load line for the diode 20 to assume the position represented by the line 36 and the operating point of the diode 20 to shift from the point 37 to the point 40 whose corresponding voltage is $e_2$.

As indicated in FIG. 1, a plurality of input sources may be connected in parallel with each of the sources 27 and 28 and the negative output signal amplitude of each of the sources may advantageously be selected to be equal to $\Delta$. The selective switching capabilities of such an arrangement for, say, the input and output conditions corresponding to the fourth row of FIG. 3 can be represented by the Boolean algebra expression $$(A_1+ \ldots +A_n)(B_1+ \ldots +B_n)=e_3$$

In other terms, the output signal of such a multisource arrangement assumes the voltage level $e_3$ if any $A$ signal *and* any $B$ signal are simultaneously applied to the arrangement.

Furthermore, although the logic arrangement shown in FIG. 1 includes only two cascaded circuits, it is to be understood that additional circuits may be added in cascade to the two circuits shown and described herein. Such additional circuits are arranged such that a given circuit has only a low voltage stable operating point when the circuit preceding the given one is in a relatively low voltage condition, but has both low and high voltage stable operating points when the preceding circuit is in a relatively high voltage condition.

It is emphasized that although particular attention herein has been directed to the use of tunnel diodes as the components 10 and 20 of the arrangement shown in FIG. 1, other two-terminal voltage-controlled negative resistance assemblies having characteristics of the type shown in FIG. 2 may also be used therefor.

Furthermore, it is to be understood that the above-described arrangements are only illustrative of the application of the principles of the present invention. Numerous other arrangements may be devised by those skilled in the art without departing from the spirit and scope of the invention.

What is claimed is:

1. In combination, first tunnel diode means, means for biasing said first diode means for bistable operation, means for switching said first diode means between its two stable operating conditions, second tunnel diode means connected across said first diode means, and means for operating said second diode means in a monostable manner when said first diode means is in one of its two stable operating conditions and for operating said second diode means in a bistable manner when said first diode means is in the other one of its two stable operating conditions.

2. The combination as in claim 1 wherein said means for switching said first diode means includes a first rectifying diode connected in series with said first tunnel diode means, and at least one input signal source connected in parallel with said first rectifying diode.

3. The combination as in claim 2 wherein said means for operating said second diode means includes a second rectifying diode connected in series with said second tunnel diode means, and at least one input signal source connected in parallel with said second rectifying diode.

4. The combination as in claim 3 further including an output utilization device connected in parallel with said second tunnel diode means.

5. A gating circuit comprising, first and second tunnel diodes, biasing means establishing a bistable loadline for said first diode and a monostable loadline for said second diode, a source of gate signals coupled to said first diode to shift its operating point from one of its stable states to another, means operative in response to said change of state of said first diode to provide a bistable loadline for said second diode, and input means coupled to said second diode to shift operation of said second diode between its two stable operating conditions.

6. A coincidence circuit comprising, a first tunnel diode biased to operate in bistable fashion, input means to shift operation of said diode between first and second stable conditions, a second tunnel diode coupled to said first diode, biasing means for said second diode operative to provide monostable operation of said second diode with said first diode in the first of said stable conditions and bistable operation of said second diode with said first diode in the second of said stable conditions, and means providing an input signal to said second diode to shift operation of said second diode between first and second stable conditions when said second diode is operating in its bistable fashion.

7. A gating circuit comprising, a pair of negative resistance devices having characteristics with a negative resistance region between two positive resistance regions, means establishing a quiescent loadline for one of said devices intersecting all three of its regions, means establishing a quiescent loadline for the other of said devices intersecting only one of its positive resistance regions, means coupling said devices to render each device a portion of the load seen by the other device, and input means coupled to said one device to shift its stable operating point from one of its positive resistance regions to the other, said shift in operating condition of said first device being operative to shift the quiescent loadline of said other device to a position which intersects all three of the regions of its characteristics.

8. The gating circuit of claim 7 above, further comprising means for applying an input signal to said other device.

9. A coincidence circuit comprising, a first tunnel diode biased to operate in bistable fashion, input means to shift operation of said diode between first and second stable conditions, a second tunnel diode coupled to said first diode, and biasing means for said second diode operative to provide monostable operation of said second diode with said first diode in the first of said stable conditions and bistable operation of said second diode with said first diode in the second of said stable conditions.

10. A self-resetting gate circuit comprising, a first tunnel diode, first biasing means establishing a bistable operating mode for said diode, a second tunnel diode, second biasing means establishing a normally monostable operating mode for said second diode, impedance means coupling like terminals of said diodes, said impedance means and said second biasing means being responsive to a shift in operating condition of said first diode from a first stable state to a second stable state to establish a bistable operating mode for said second diode, and means responsive to input signals to shift the operation of said second diode between its two stable states when said second diode is in its bistable operating mode.

References Cited by the Examiner

UNITED STATES PATENTS

| | | | |
|---|---|---|---|
| 2,713,132 | 7/55 | Matthews et al. | 307—88.5 |
| 2,944,164 | 7/60 | Odell et al. | 307—88.5 |
| 2,966,599 | 12/60 | Haas | 307—88.5 |

OTHER REFERENCES

IBM Disclosure Bulletin, vol. 2, No. 5, February 1960, "Current Overshoot Detector," Haddon et al.

Electronics, by MaGuire, January 29, 1960, page 56.

ARTHUR GAUSS, *Primary Examiner.*

HERMAN KARL SAALBACH, GEORGE N. WESTBY, *Examiners.*